(12) United States Patent
Sinha

(10) Patent No.: US 9,086,506 B2
(45) Date of Patent: Jul. 21, 2015

(54) ESTIMATING FORMATION STRESSES USING RADIAL PROFILES OF THREE SHEAR MODULI

(75) Inventor: Bikash K. Sinha, Cambridge, MA (US)

(73) Assignee: Schlumberger Technology Corporation, Cambridge, MA (US)

(*) Notice: Subject to any disclaimer, the term of this patent is extended or adjusted under 35 U.S.C. 154(b) by 1127 days.

(21) Appl. No.: 12/179,300

(22) Filed: Jul. 24, 2008

(65) Prior Publication Data
US 2010/0020642 A1 Jan. 28, 2010

(51) Int. Cl.
*G01V 1/28* (2006.01)
*G01V 1/44* (2006.01)

(52) U.S. Cl.
CPC .......................... *G01V 1/44* (2013.01)

(58) Field of Classification Search
CPC ........................................................ G01V 1/28
USPC ................................. 367/25, 31, 75
See application file for complete search history.

(56) References Cited

U.S. PATENT DOCUMENTS

| | | | |
|---|---|---|---|
| 4,813,028 A | 3/1989 | Liu | |
| 5,838,633 A | 11/1998 | Sinha | |
| 6,098,021 A | 8/2000 | Tang et al. | |
| 6,351,991 B1 * | 3/2002 | Sinha | 73/152.01 |
| 6,611,761 B2 | 8/2003 | Sinha et al. | |
| 6,904,365 B2 * | 6/2005 | Bratton et al. | 702/9 |
| 7,042,802 B2 | 5/2006 | Sinha | |
| 8,004,932 B2 | 8/2011 | Zheng et al. | |
| 8,036,829 B2 | 10/2011 | Gibbs et al. | |
| 2006/0285437 A1 * | 12/2006 | Sinha et al. | 367/37 |
| 2010/0020642 A1 | 1/2010 | Sinha | |

OTHER PUBLICATIONS

Sinha et al., "Radial profiling of the three formation shear moduli and its application to well completions", Geophysics, vol. 71, No. 6, Nov.-Dec. 2006, pp. E65-E77.*
Sinha et al, "RAdial profiling of the three formation shear moduli and its application to well completions" Geophysics, vol. 71, No. 6, Nov.-Dec. 2006, pp. E65-E77.*

(Continued)

*Primary Examiner* — Isam Alsomiri
*Assistant Examiner* — Amienatta M Ndure Jobe
(74) *Attorney, Agent, or Firm* — Jakub Michna

(57) ABSTRACT

Maximum and minimum horizontal stresses, and horizontal to overburden stress ratio, are estimated using radial profiles of shear moduli. Inversion enables estimation of maximum and minimum horizontal stresses using radial profiles of three shear moduli associated with an orthogonal set of axes defined by the three principal stress directions. Differences in the far-field shear moduli are inverted together with two difference equations obtained from the radial profiles of the dipole shear moduli $C_{44}$ and $C_{55}$, and borehole stresses in the near-wellbore region. The horizontal to overburden stress ratio is estimated using differences in the compressional, dipole shear, and Stoneley shear slownesses at two depths in the same lithology interval where the formation exhibits azimuthal isotropy in cross-dipole dispersions, implying that horizontal stresses are nearly the same at all azimuths. The overburden to horizontal stress ratio in a formation with axial heterogeneity may also be estimated using the far-field Stoneley shear modulus $C_{66}$ and dipole shear modulus $C_{55}$ together with the radial variation of the dipole shear modulus $C_{55}$ caused by near-wellbore stress concentrations.

6 Claims, 7 Drawing Sheets

(56) References Cited

OTHER PUBLICATIONS

Scott Jr et al, Acoustic Measurements of the Anisotropy of Dynamic Elastic and Poromechanics Moduli under Three Stress/Strain Pathways, 2005.*
Sinha K. Bikash, Recent Advances in Borehole Sonic Technology, 2008.*
Wong et al, Inherent transversely isotropic elastic parameters of over-consolidated shale measured by ultrasonic waves and their comparison with static and acoustic in situ log measurements, 2008.*
Ekstrom, "Dispersion estimation from borehole acoustic arrays using a modified matrix pencil algorithm", IEEE, Proceedings of Asilomar-29, 1996, pp. 449-453.
Jaeger et al, "Further Problems in Elasticity", Fundamental of Rock Mechanics, Chapter 10, Chapman and Hall, NY, 1979, pp. 241-307.
Kirsch, G, "Die theorie der elastizitat und die bedurfnisse der festigkeitslehre", Z. Ver. Ingen, 42, 1989, pp. 797-807.
Pistre et al, "A modular wireline sonic tool for measurements of 3D (Azimuthal, Radial, and Axial) formation acoustic properties", SPWLA 46th Annual Logging Symposium, Society of Professional Well Log Analysts, Jun. 26-29, 2005, 13 pp.
Sinha, Bikash, "Elastic waves in crystals under a bias", Ferroelectrics, 1982, vol. 41, pp. 61-73.
Thurston et al, "Third-order elastic constants and the velocity of small amplitude elastic waves in homogeneously stressed media", Physical Review, vol. 133, No. 6A, Mar. 1964, pp. A1604-A1610.
Desroches, et al., "Applications of Wireline Stress Measurements", SPE 58086—SPE Reservoir Evaluation & Engineering, vol. 2, No. 5, 1999, pp. 451-461.
Norris, et al., "Acoustoelasticity of solid/fluid composite systems", Geophysical Journal International, vol. 118, Issue 2, Aug. 1994, pp. 439-446.
Raaen, et al., "Improved routine estimation of the minimum horizontal stress component from extended leak-off tests", International Journal of Rock Mechanics and Mining Sciences, vol. 43, Issue 1, Jan. 2006, pp. 37-48.
Sinha, et al., "Estimation of Formation Stresses Using Borehole Sonic Data", SPWLA 49th Annual Logging Symposium, May 25-28, 2008, pp. 1-16.
Sinha, et al., "Estimation of Formation Stresses Using Radial Variation of Three Shear Moduli—A Case Study From a High-Pressure and High-Temperature Reservoir in a Norwegian Continental Shelf", SPE 109842—SPE Annual Technical Conference and Exhibition, Anaheim, California, U.S.A., Nov. 11-14, 2007, 9 pages.
White, et al., "The use of leak-off tests as means of predicting minimum in-situ stress", Petroleum Geoscience, vol. 8, No. 2, May 2002, pp. 189-193.

* cited by examiner

US 9,086,506 B2

ESTIMATING FORMATION STRESSES USING RADIAL PROFILES OF THREE SHEAR MODULI

FIELD OF THE INVENTION

The invention is generally related to analysis of subterranean formations, and more particularly to estimating formation stresses using radial profiles of three shear moduli.

BACKGROUND OF THE INVENTION

Formation stresses can affect geophysical prospecting and development of oil and gas reservoirs. For example, overburden stress, maximum and minimum horizontal stresses, pore pressure, wellbore pressure and rock strength can be used to produce a failure model to aid in well planning, wellbore stability calculations and reservoir management. It is known that elastic wave velocities change as a function of prestress in a propagating medium. For example, sonic velocities in porous rocks change as a function of effective prestress. However, estimating formation stresses based on velocity can be problematic because of influences on the horizontal shear modulus $C_{66}$. For example, the horizontal shear modulus $C_{66}$ is reduced in the presence of horizontal fluid mobility in a porous reservoir. Generally, the tube wave slowness decreases by about 2 to 3% in the presence of fluid mobility, resulting in a decrease in $C_{66}$ by about 4 to 6%. Conversely, the horizontal shear modulus $C_{66}$ is increased in the presence of high clay content in a shale interval. Consequently, it is difficult to accurately estimate the ratio of vertical to horizontal stress ratios without compensating for the changes in $C_{66}$.

Various devices are known for measuring formation characteristics based on sonic data. Mechanical disturbances are used to establish elastic waves in earth formations surrounding a borehole, and properties of the waves are measured to obtain information about the formations through which the waves have propagated. For example, compressional, shear and Stoneley wave information, such as velocity (or its reciprocal, slowness) in the formation and in the borehole can help in evaluation and production of hydrocarbon resources. One example of a sonic logging device is the Sonic Scanner® from Schlumberger. Another example is described in Pistre et al., "A modular wireline sonic tool for measurements of 3D (azimuthal, radial, and axial) formation acoustic properties, by Pistre, V., Kinoshita, T., Endo, T., Schilling, K., Pabon, J., Sinha, B., Plona, T., Ikegami, T., and Johnson, D.", Proceedings of the 46th Annual Logging Symposium, Society of Professional Well Log Analysts, Paper P, 2005. Other tools are also known. These tools may provide compressional slowness, $\Delta t_c$, shear slowness, $\Delta t_s$, and Stoneley slowness, $\Delta t_{st}$, each as a function of depth, z, where slowness is the reciprocal of velocity and corresponds to the interval transit time typically measured by sonic logging tools. An acoustic source in a fluid-filled borehole generates headwaves as well as relatively stronger borehole-guided modes. A standard sonic measurement system uses a piezoelectric source and hydrophone receivers situated inside the fluid-filled borehole. The piezoelectric source is configured as either a monopole or a dipole source. The source bandwidth typically ranges from a 0.5 to 20 kHz. A monopole source primarily generates the lowest-order axisymmetric mode, also referred to as the Stoneley mode, together with compressional and shear headwaves. In contrast, a dipole source primarily excites the lowest-order flexural borehole mode together with compressional and shear headwaves. The headwaves are caused by the coupling of the transmitted acoustic energy to plane waves in the formation that propagate along the borehole axis. An incident compressional wave in the borehole fluid produces critically refracted compressional waves in the formation. Those refracted along the borehole surface are known as compressional headwaves. The critical incidence angle $\theta_i = \sin^{-1}(V_f/V_c)$, where $V_f$ is the compressional wave speed in the borehole fluid; and $V_c$ is the compressional wave speed in the formation. As the compressional headwave travels along the interface, it radiates energy back into the fluid that can be detected by hydrophone receivers placed in the fluid-filled borehole. In fast formations, the shear headwave can be similarly excited by a compressional wave at the critical incidence angle $\theta_i = \sin^{-1}(V_f/V_s)$, where $V_s$ is the shear wave speed in the formation. It is also worth noting that headwaves are excited only when the wavelength of the incident wave is smaller than the borehole diameter so that the boundary can be effectively treated as a planar interface. In a homogeneous and isotropic model of fast formations, as above noted, compressional and shear headwaves can be generated by a monopole source placed in a fluid-filled borehole for determining the formation compressional and shear wave speeds. It is known that refracted shear headwaves cannot be detected in slow formations (where the shear wave velocity is less than the borehole-fluid compressional velocity) with receivers placed in the borehole fluid. In slow formations, formation shear velocities are obtained from the low-frequency asymptote of flexural dispersion. There are standard processing techniques for the estimation of formation shear velocities in either fast or slow formations from an array of recorded dipole waveforms. A different type of tool described in U.S. Pat. No. 6,611,761, issued Aug. 26, 2003 for "Sonic Well Logging for Radial Profiling" obtains radial profiles of fast and slow shear slownesses using the measured dipole dispersions in the two orthogonal directions that are characterized by the shear moduli $c_{44}$ and $c_{55}$ for a borehole parallel to the $X_3$-axis in an orthorhombic formation.

SUMMARY OF THE INVENTION

In accordance with an embodiment of the invention, a method for estimating stress in a formation in which a borehole is present comprises: determining radial profiles of Stoneley, fast dipole shear and slow dipole shear slownesses; estimating maximum and minimum horizontal stresses by inverting differences in far-field shear moduli with difference equations obtained from radial profiles of dipole shear moduli C44 and C55, and borehole stresses proximate to the borehole; and producing an indication of the maximum and minimum horizontal stresses in tangible form.

In accordance with another embodiment of the invention, apparatus for estimating stress in a formation in which a borehole is present comprises: at least one acoustic sensor that provides radial profiles of Stoneley, fast dipole shear and slow dipole shear slownesses; processing circuitry that estimates maximum and minimum horizontal stresses by inverting differences in far-field shear moduli with difference equations obtained from radial profiles of dipole shear moduli $C_{44}$ and $C_{55}$, and borehole stresses proximate to the borehole; and an output that produces an indication of the maximum and minimum horizontal stresses in tangible form.

DETAILED DESCRIPTION

Figure 1:
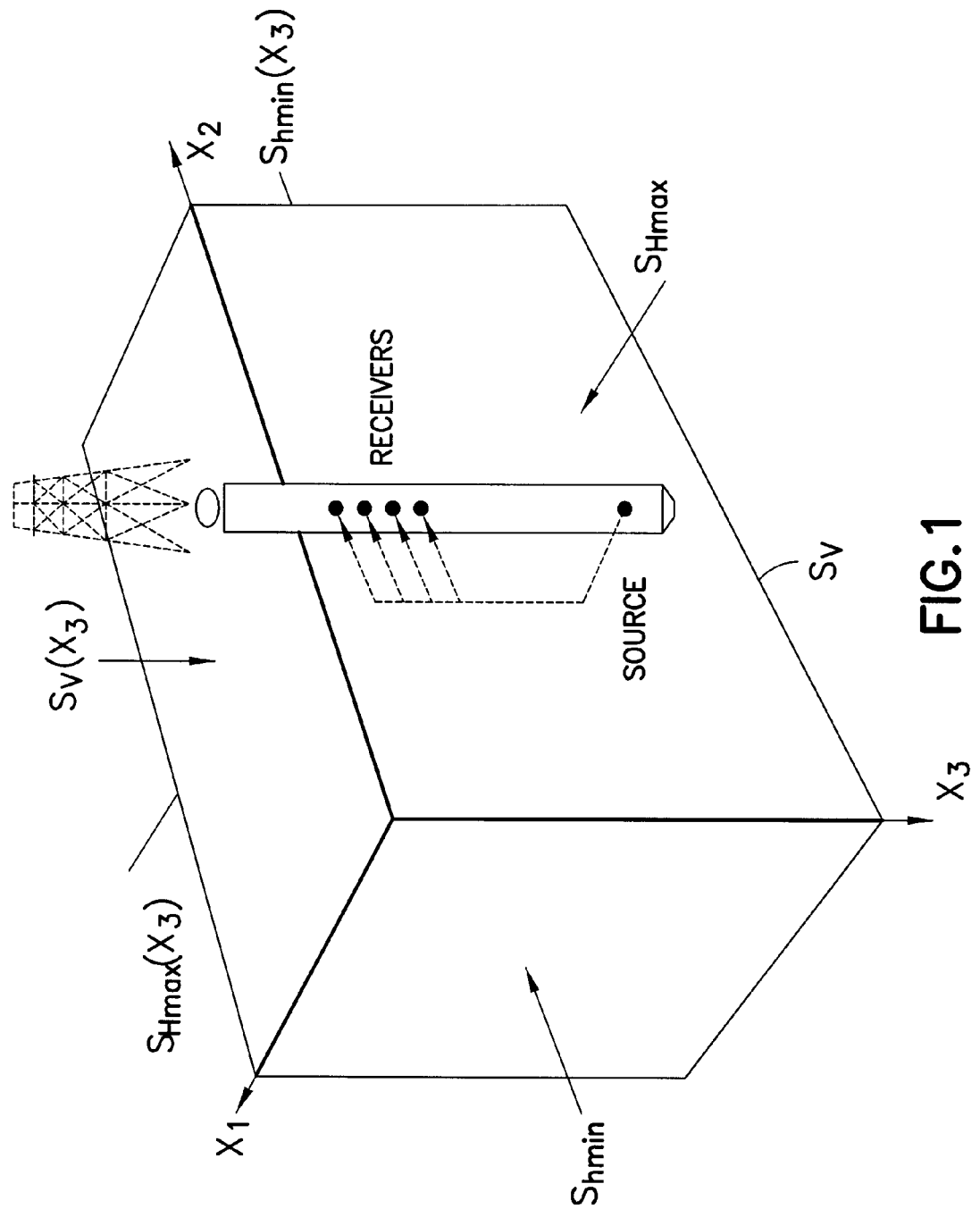
FIG. 1 is a schematic diagram of a borehole in a formation subject to the far-field principal stresses.
Figure 2:
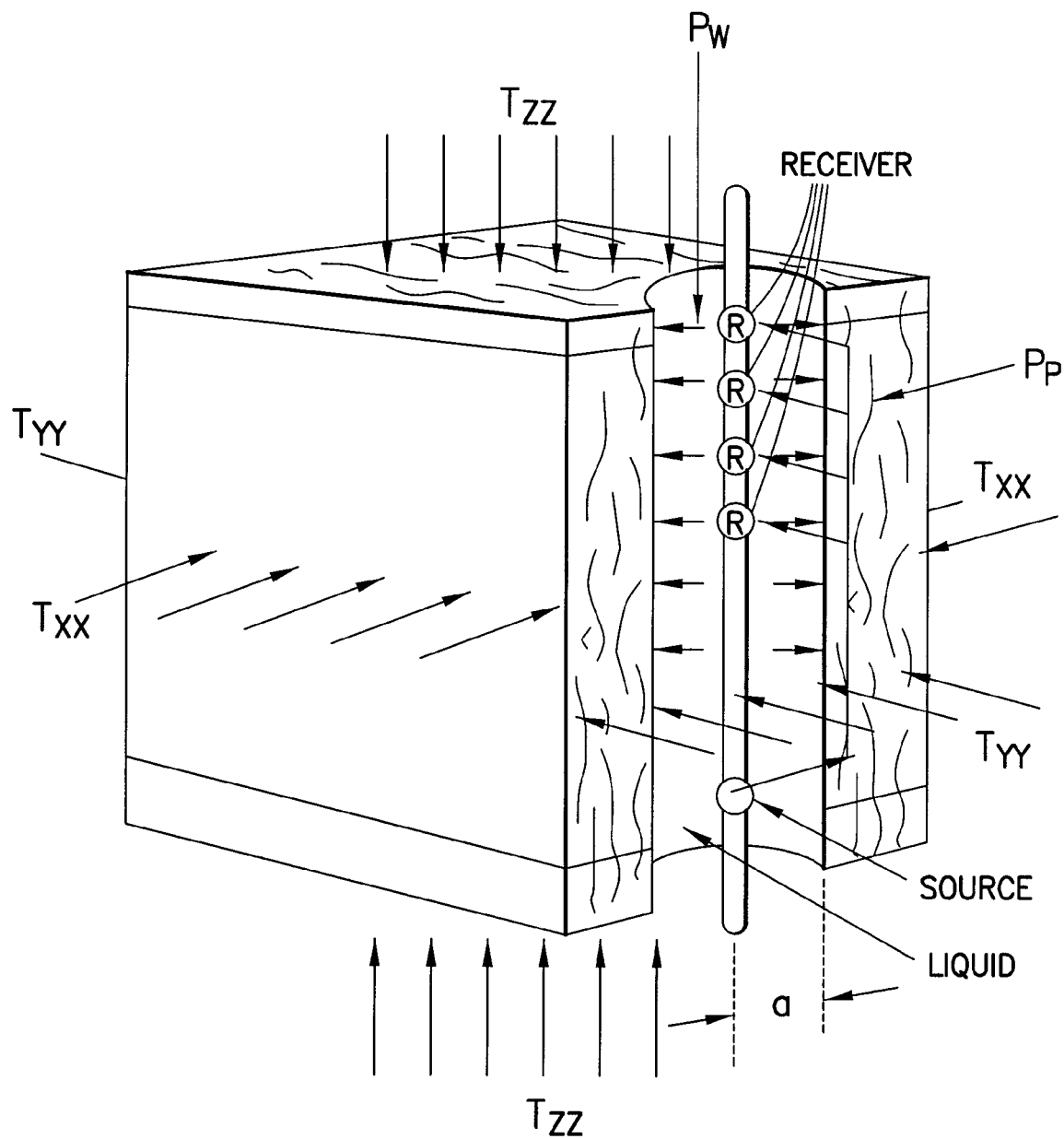
FIG. 2 is a schematic diagram of a borehole of radius "a" subject to formation stresses in a poroelastic formation with pore pressure $P_P$ and wellbore pressure $P_W$.

Embodiments of the invention will be described with reference to principal stresses illustrated in FIG. 1, and triaxial stresses Txx, Tyy, and Tzz, together with wellbore pressure Pw, and pore pressure Pp as illustrated in FIG. 2. The borehole radius is denoted by "a." As previously discussed, sonic velocities, and therefore slownesses, are sensitive to effective stresses in the propagating medium. Effective stress $\sigma_{ij}=T_{ij}-\delta_{ij}P_P$, where $T_{ij}$ is the applied stress, $\delta_{ij}$ is the Kronecker delta, and $P_P$ is the pore pressure.

Figure 3:
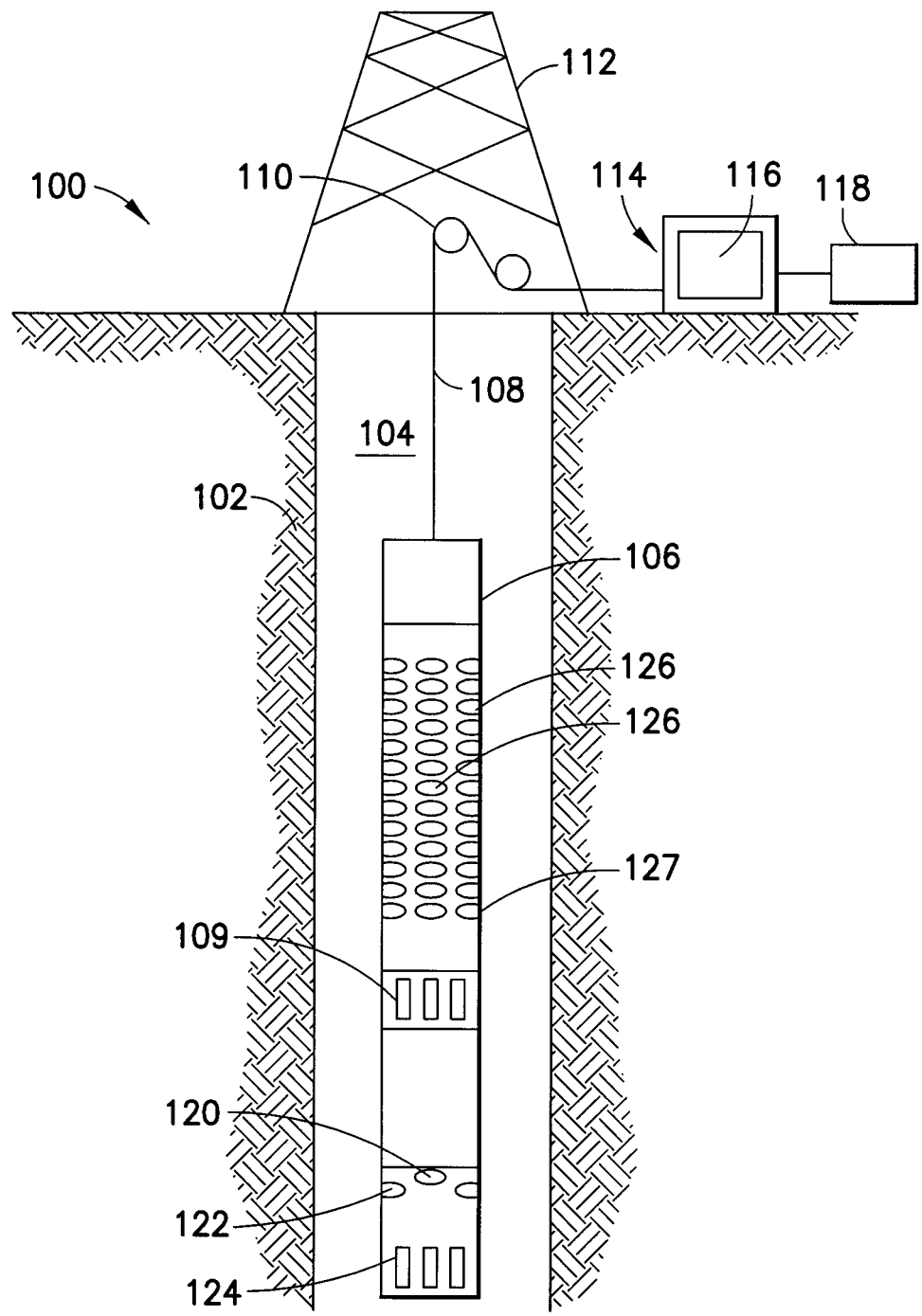
FIG. 3 illustrates a logging tool for estimating formation stresses using radial profiles of three shear moduli.

FIG. 3 illustrates one example of a logging tool (106) used to acquire and analyze data in accordance with an embodiment of the invention. The tool has a plurality of receivers and transmitters. The illustrated logging tool (106) also includes multi-pole transmitters such as crossed dipole transmitters (120, 122) (only one end of dipole (120) is visible in FIG. 1) and monopole transmitters (109) (close) and (124) (far) capable of exciting compressional, shear, Stoneley, and flexural waves. The logging tool (106) also includes receivers (126), which are spaced apart some distance from the transmitters. Each receiver may include multiple hydrophones mounted azimuthally at regular intervals around the circumference of the tool. Other configurations, such as a Digital Sonic Imaging (DSI) tool with four receivers at each of eight receiver stations, or incorporating other multi-pole sources such as quadrupole, are also possible. The use of a plurality of receivers and transmitters results in improved signal quality and adequate extraction of the various borehole signals over a wide frequency band However, the distances, number and types of receivers and transmitters shown in this embodiment are merely one possible configuration, and should not be construed as limiting the invention.

The subsurface formation (102) is traversed by a borehole (104) which may be filled with drilling fluid or mud. The logging tool (106) is suspended from an armored cable (108) and may have optional centralizers (not shown). The cable (108) extends from the borehole (104) over a sheave wheel (110) on a derrick (112) to a winch forming part of surface equipment, which may include an analyzer unit (114). Well known depth gauging equipment (not shown) may be provided to measure cable displacement over the sheave wheel (110). The tool (106) may include any of many well known devices to produce a signal indicating tool orientation. Processing and interface circuitry within the tool (106) amplifies, samples and digitizes the tool's information signals for transmission and communicates them to the analyzer unit (114) via the cable (108). Electrical power and control signals for coordinating operation of the tool (106) may be generated by the analyzer unit (114) or some other device, and communicated via the cable (108) to circuitry provided within the tool (106). The surface equipment includes a processor subsystem (116) (which may include a microprocessor, memory, clock and timing, and input/output functions—not separately shown), standard peripheral equipment (not separately shown), and a recorder (118).

Figure 4:
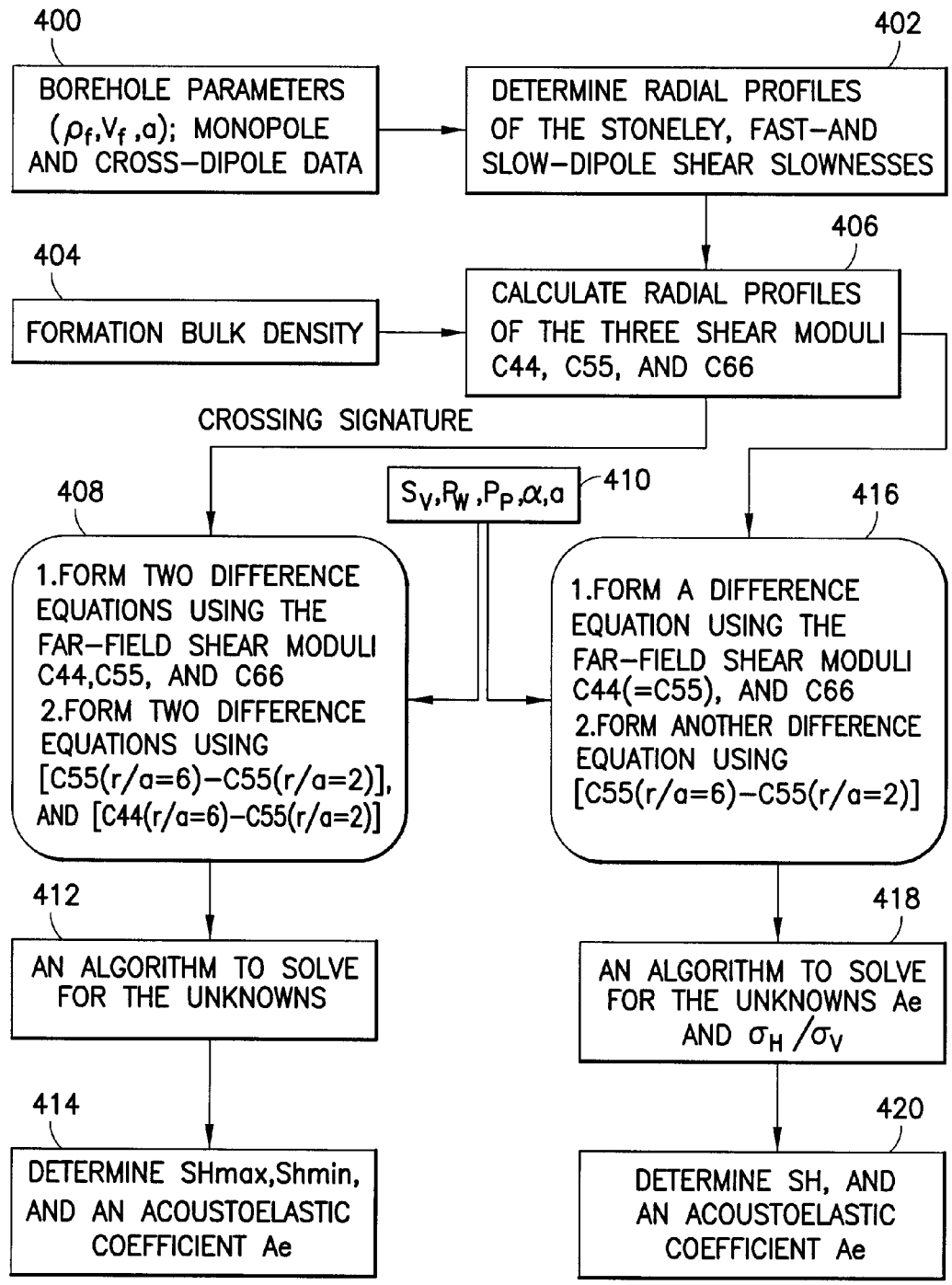
FIG. 4 is a flow diagram illustrating steps of a method in accordance with an embodiment of the invention.

FIG. 4 is a flow diagram that illustrates a method of estimating formation stresses using radial profiles of three shear moduli. If practical, a depth interval characterized by relatively uniform lithology is selected for evaluation of stresses. Monopole and cross-dipole sonic data is then obtained with the tool (106, FIG. 3) over the selected interval, as indicated by step (400). The monopole and cross-dipole data, density ($\rho_f$) far field velocity ($V_f$), and borehole radius (a) are used to determine radial profiles of Stoneley, fast dipole shear slowness and slow dipole shear slowness as indicated by step (402). Formation bulk density ($\rho_b$) obtained in step (404) is then used to calculate radial profiles of the three shear moduli (C44, C55, C66) as shown in step (406). The next step is selected based on the result of the shear moduli calculation.

Figure 5:
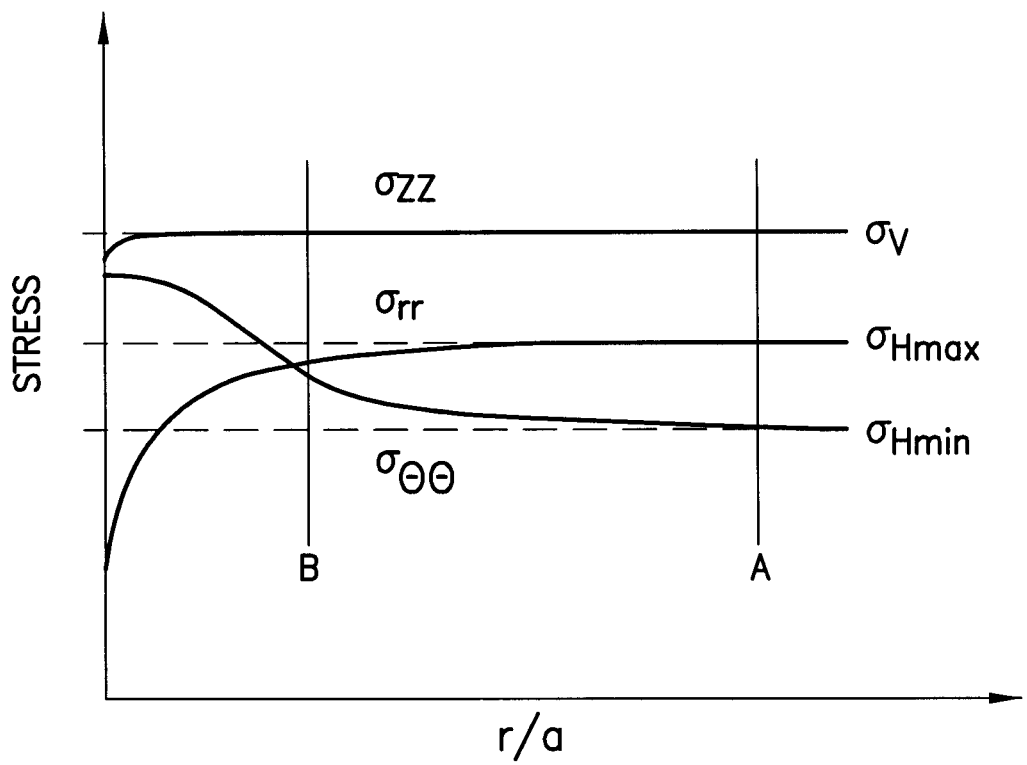
FIG. 5 illustrates radial variation of axial ($\sigma ZZ$), hoop ($\sigma\theta\theta$), and radial ($\sigma rr$) effective stresses at an azimuth parallel to the maximum horizontal stress direction at a given depth.
Figure 6:
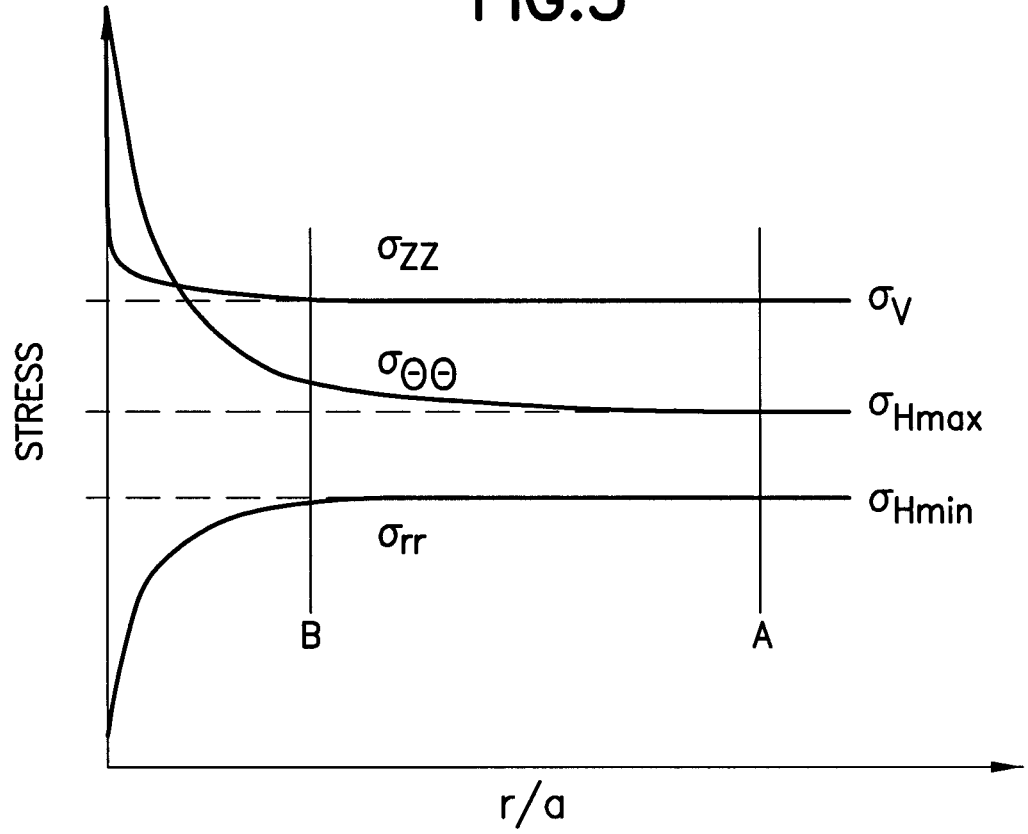
FIG. 6 illustrates radial variation of axial ($\sigma ZZ$), hoop ($\sigma\theta\theta$), and radial ($\sigma rr$) effective stresses at an azimuth perpendicular to the maximum horizontal stress direction.

Prior to describing selection of the next step, the effects of borehole presence in a formation will be explained with reference to FIGS. 5 and 6. The presence of a borehole causes near-wellbore stress distributions that can be described by the following equations (Jaeger and Cook, 1969)

$$\sigma_{rr} = \frac{(\sigma_H + \sigma_h)}{2}\left(1 - \frac{a^2}{r^2}\right) + \frac{(\sigma_H - \sigma_h)}{2}\left(1 - \frac{4a^2}{r^2} + \frac{3a^4}{r^4}\right)\cos 2\theta - P_W \frac{a^2}{r^2}, \quad (1)$$

$$\sigma_{\theta\theta} = \frac{(\sigma_H + \sigma_h)}{2}\left(1 - \frac{a^2}{r^2}\right) - \frac{(\sigma_H - \sigma_h)}{2}\left(1 + \frac{3a^4}{r^4}\right)\cos 2\theta + P_W \frac{a^2}{r^2}, \quad (2)$$

$$\sigma_{r\theta} = -\frac{(\sigma_H - \sigma_h)}{2}\left(1 + \frac{2a^2}{r^2} - \frac{3a^4}{r^4}\right)\sin 2\theta, \quad (3)$$

$$\sigma_{ZZ} = \sigma_V - \nu\frac{(\sigma_H - \sigma_h)}{2}\frac{2a^2}{r^2}\cos 2\theta, \quad (4)$$

where $\sigma_{rr}$, $\sigma_{\theta\theta}$, $\sigma_{r\theta}$, and $\sigma_{ZZ}$ denote the effective radial, hoop, radial-shear, and axial stresses, respectively; $\sigma_V$, $\sigma_H$, and $\sigma_h$ represent the effective far-field overburden, maximum horizontal, minimum horizontal stresses, respectively; and "a" denotes the borehole radius, and $\theta$ is the azimuth measured from the maximum horizontal stress direction. In the absence of a borehole, the far-field stresses are given by:

$$\sigma_{rr} = \frac{(\sigma_H + \sigma_h)}{2} + \frac{(\sigma_H - \sigma_h)}{2}\cos 2\theta, \quad (5)$$

$$\sigma_{\theta\theta} = \frac{(\sigma_H + \sigma_h)}{2} - \frac{(\sigma_H - \sigma_h)}{2}\cos 2\theta, \quad (6)$$

$$\sigma_{ZZ} = \sigma_V, \sigma_{r\theta} = -\frac{(\sigma_H - \sigma_h)}{2}\sin 2\theta, \text{ and} \quad (8)$$

Subtracting the far-field stresses from the near-wellbore stresses yields incremental stresses as the borehole surface is approached as follows:

$$\Delta\sigma_{rr} = \frac{(\sigma_H + \sigma_h)}{2}\left(\frac{a^2}{r^2}\right) - \frac{(\sigma_H - \sigma_h)}{2}\left(\frac{4a^2}{r^2} - \frac{3a^4}{r^4}\right)\cos 2\theta - P_W\frac{a^2}{r^2}, \quad (9)$$

$$\Delta\sigma_{\theta\theta} = \frac{(\sigma_H + \sigma_h)}{2}\left(\frac{a^2}{r^2}\right) + \frac{(\sigma_H - \sigma_h)}{2}\left(\frac{3a^4}{r^4}\right)\cos 2\theta + P_W\frac{a^2}{r^2}, \quad (10)$$

$$\Delta\sigma_{r\theta} = -\frac{(\sigma_H - \sigma_h)}{2}\left(\frac{2a^2}{r^2} - \frac{3a^4}{r^4}\right)\sin 2\theta, \quad (11)$$

$$\Delta\sigma_{ZZ} = -\nu(\sigma_H - \sigma_h)\left(\frac{2a^2}{r^2}\right)\cos 2\theta, \quad (12)$$

where $P_W$ denotes the wellbore pressure at a given depth.

In the case of an isotropically loaded reference state, shear moduli in the three orthogonal planes are the same, i.e., $C_{44}=C_{55}=C_{66}=\mu$. When this type of formation is subject to anisotropic incremental stresses, changes in the shear moduli can be expressed as $$\Delta C_{55} = [C_{55} - \nu C_{144} + (1-\nu)C_{155}]\frac{\Delta\sigma_{11}}{2\mu(1+\nu)} + \quad (13)$$

$$[C_{144} - (1+2\nu)C_{55} - 2\nu C_{155}]\frac{\Delta\sigma_{22}}{2\mu(1+\nu)} +$$

$$[2\mu(1+\nu) + C_{55} - \nu C_{144} + (1-\nu)C_{155}]\frac{\Delta\sigma_{33}}{2\mu(1+\nu)},$$

where $\Delta C_{55}$ is obtained from the fast-dipole shear slowness from sonic data acquired by a dipole transmitter aligned parallel to the $X_1$-direction and borehole parallel to the $X_3$-direction; the quantities $C_{55}$, $\mu$, and $\nu$ are the linear elastic moduli, whereas $C_{144}$ and $C_{155}$ are the formation nonlinear constants in the chosen reference state; and $\Delta\sigma_{33}$, $\Delta\sigma_{11}$, and $\Delta\sigma_{22}$, respectively, denote the effective overburden (parallel to the $X_3$-direction), maximum horizontal (parallel to the $X_1$-direction), and minimum horizontal (parallel to the $X_2$-direction) stresses at a chosen depth of interest, $$\Delta C_{44} = [-(1+2\nu)C_{44} + C_{144} - 2\nu C_{155}]\frac{\Delta\sigma_{11}}{2\mu(1+\nu)} + \quad (14)$$

$$[-\nu C_{144} + C_{44} + (1-\nu)C_{155}]\frac{\Delta\sigma_{22}}{2\mu(1+\nu)} +$$

$$[2\mu(1+\nu) + C_{44} - \nu C_{144} + (1-\nu)C_{155}]\frac{\Delta\sigma_{33}}{2\mu(1+\nu)},$$

where $\Delta C_{44}$ is obtained from the slow-dipole shear slowness from sonic data acquired by a dipole transmitter aligned parallel to the $X_2$-direction and borehole parallel to the $X_3$-direction;

$$\Delta C_{66} = [\mu(1+\nu) + C_{66} - \nu C_{144} + (1-\nu)C_{155}]\frac{(\Delta\sigma_{11} + \Delta\sigma_{22})}{2\mu(1+\nu)} + \quad (15)$$

$$[-(1+2\nu)C_{66} + C_{144} - 2\nu C_{155}]\frac{\Delta\sigma_{33}}{2\mu(1+\nu)},$$

where $\Delta C_{66}$ is obtained from the Stoneley shear slowness dispersion from sonic data acquired by a monopole transmitter at a chosen depth of interest.

Figure 7:
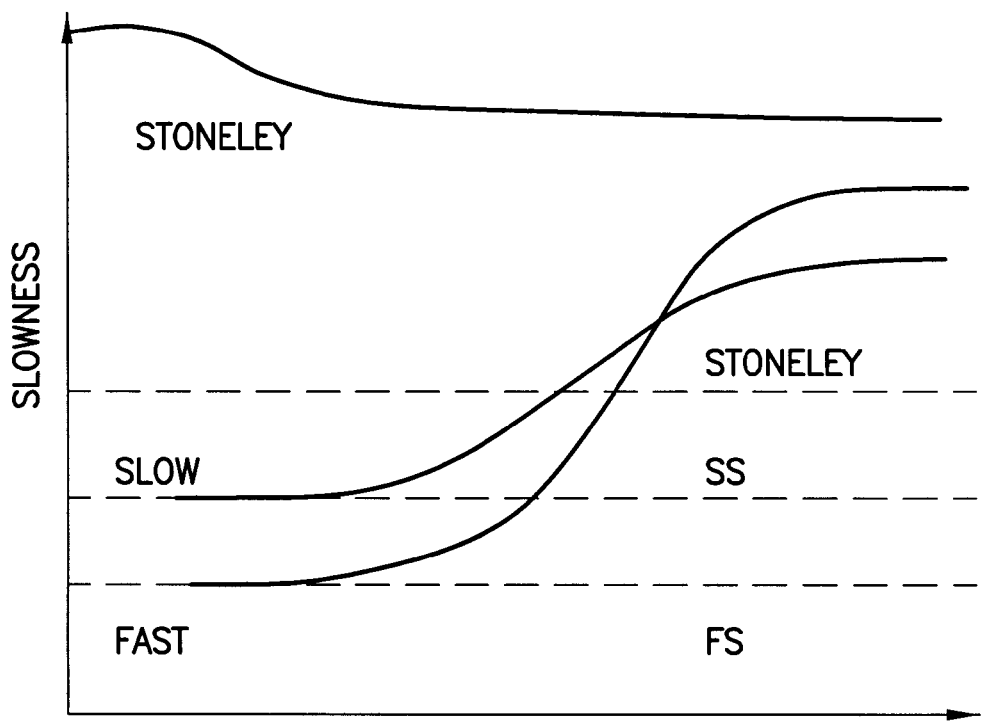
FIG. 7 illustrates fast and slow shear dispersion curves which exhibit a crossing signature together with the lowest-order axisymmetric Stoneley dispersion

Referring to FIGS. 4 and 7, in the case where the fast and slow shear dispersion curves exhibit a crossing signature, step (408) is used. Step (408) includes two component calculations that are made with the aid of overburden stress ($S_V$), wellbore pressure ($P_W$), pore pressure ($P_P$), Biot coefficient α, and borehole radius (a) data, obtained in step (410). A first component calculation is to form two difference equations using the far-field shear moduli C44, C55, and C66. A second component calculation is to form two difference equations using [C55(r/a=6)−C55(r/a=2)] and [C44(r/a=6)−C55(r/a=2)]. Assuming that $X_1$-, $X_2$-, and $X_3$-axes, respectively, are parallel to the maximum horizontal ($\sigma_H$), minimum horizontal ($\sigma_h$), and vertical ($\sigma_V$) stresses, equations (13)-(15) yield difference equations in the effective shear moduli in terms of differences in the principal stress magnitudes through an acoustoelastic coefficient defined in terms of formation nonlinear constants referred to a chosen reference state and for a given formation lithology. The following three equations relate changes in the shear moduli to corresponding changes in the effective principal stresses in a homogeneously stressed formation as would be the case in the far-field, sufficiently away from the borehole surface:

$$\Delta C_{44} - \Delta C_{66} = A_E(\Delta\sigma_{33} - \Delta\sigma_{11}), \quad (16)$$

$$\Delta C_{55} - \Delta C_{66} = A_E(\Delta\sigma_{33} - \Delta\sigma_{22}), \quad (17)$$

$$\Delta C_{55} - \Delta C_{44} = A_E(\Delta\sigma_{11} - \Delta\sigma_{22}), \quad (18)$$

where $\Delta\sigma_{33}$, $\Delta\sigma_{11}$, and $\Delta\sigma_{22}$ denote changes in the effective overburden, maximum horizontal, and minimum horizontal stresses, respectively; and $$A_E = 2 + \frac{C_{456}}{\mu}, \quad (19)$$

is the acoustoelastic coefficient, $C_{55}$ and $C_{44}$ denote the shear moduli for the fast and slow shear waves, respectively; $C_{456}=(C_{155}-C_{144})/2$, is a formation nonlinear parameter that defines the acoustoelastic coefficient; and μ represents the shear modulus in a chosen reference state. However, only two of the three difference equations (16), (17), and (18) are independent. The presence of differential stress in the cross-sectional plane of the borehole causes dipole shear wave splitting and the observed shear slowness anisotropy can be used to calculate the acoustoelastic coefficient $A_E$ from equation (18), provided estimates of the three principal stresses as a function of depth are available. Note that the dipole shear waves are largely unaffected by the fluid mobility. The stress-induced change in the Stoneley shear modulus $C_{66}$ is then calculated using equations (16) and (17), and the effective stress magnitudes $\Delta\sigma_V$, $\Delta\sigma_H$, and $\Delta\sigma_h$ at a given depth are obtained.

The next step (412) is to use an algorithm to solve for the unknowns. Combining the two difference equations (16) and (17) in terms of the far-field shear moduli yields four independent equations to solve for the four unknowns—$\Delta\sigma_H$, $\Delta\sigma_h$, $C_{144}$ and $C_{155}$. Equations (13), (14), and (15) can be expressed in terms of the principal stress parameters $\Delta\theta_H$, $\Delta\theta_h$, and $\Delta\theta_V$ as follows:

$$\Delta C_{55} = [C_{55} - \nu C_{144} + (1-\nu)C_{155}]\frac{\Delta\sigma_H}{2\mu(1+\nu)} + \qquad (20)$$
$$[C_{144} - (1+2\nu)C_{55} - 2\nu C_{155}]\frac{\Delta\sigma_h}{2\mu(1+\nu)} +$$
$$[2\mu(1+\nu) + C_{55} - \nu C_{144} + (1-\nu)C_{155}]\frac{\Delta\sigma_V}{2\mu(1+\nu)},$$

$$\Delta C_{44} = [-(1+2\nu)C_{44} + C_{144} - 2\nu C_{155}]\frac{\Delta\sigma_H}{2\mu(1+\nu)} + \qquad (21)$$
$$[-\nu C_{144} + C_{44} + (1-\nu)C_{155}]\frac{\Delta\sigma_h}{2\mu(1+\nu)} +$$
$$[2\mu(1+\nu) + C_{44} - \nu C_{144} + (1-\nu)C_{155}]\frac{\Delta\sigma_V}{2\mu(1+\nu)},$$

$$\Delta C_{66} = [\mu(1+\nu) + C_{66} - \nu C_{144} + (1-\nu)C_{144}]\frac{(\Delta\sigma_H + \Delta\sigma_h)}{2\mu(1+\nu)} + \qquad (22)$$
$$[-(1+2\nu)C_{66} + C_{144} - 2\nu C_{155}]\frac{\Delta\sigma_V}{2\mu(1+\nu)},$$

Defining the following non-dimensional parameters $$S_H = \frac{\Delta\sigma_H}{2\mu(1+\nu)}, \; S_h = \frac{\Delta\sigma_h}{2\mu(1+\nu)}, \; S_v = \frac{\Delta\sigma_v}{2\mu(1+\nu)}, \qquad (23)$$
and
$$A_1 = -\nu C_{144} + (1-\nu)C_{155}, \; A_2 = C_{144} - 2\nu C_{155}, \qquad (24)$$

it is possible to express the nonlinear constants $C_{144}$ and $C_{155}$ in terms of $A_1$ and $A_2$, and the acoustoelastic coefficient $A_E$ can also be expressed in terms of $A_1$ and $A_2$ as shown below:

$$C_{144} = \frac{2\nu A_1 + (1-\nu)A_2}{(1-2\nu)(1+\nu)}, \; C_{155} = \frac{A_1 + \nu A_2}{(1-2\nu)(1+\nu)}, \qquad (25)$$

$$C_{155} - C_{144} = \frac{A_1 - A_2}{1+\nu}, \qquad (26)$$

$$A_E = 2 + \frac{1}{2\mu}(C_{155} - C_{144}) = 2 + \frac{A_1 - A_2}{2\mu(1+\nu)}, \qquad (27)$$

$$\Delta C_{44} - \Delta C_{66} = A_E(\Delta\sigma_V - \Delta\sigma_H), \qquad (28)$$

$$\Delta C_{55} - \Delta C_{66} = A_E(\Delta\sigma_V - \Delta\sigma_h). \qquad (29)$$

An expression for the stress ratio is obtained from equations (16) and (17)

$$\frac{\Delta\sigma_h}{\Delta\sigma_V} = 1 - \frac{\Delta C_{55} - \Delta C_{66}}{\Delta C_{44} - \Delta C_{66}} + \left(\frac{\Delta C_{55} - \Delta C_{66}}{\Delta C_{44} - \Delta C_{66}}\right)\frac{\Delta\sigma_h}{\Delta\sigma_V} \qquad (30)$$
$$= \frac{\Delta C_{44} - \Delta C_{55}}{\Delta C_{44} - \Delta C_{66}} + \left(\frac{\Delta C_{55} - \Delta C_{66}}{\Delta C_{44} - \Delta C_{66}}\right)\frac{\Delta\sigma_H}{\Delta\sigma_V}.$$

Subtracting equation (28) from (29), and substituting for $A_E$ from equation (27), yields $$\Delta C_{55} - \Delta C_{44} = [2\mu(1+\nu) + A_1 - A_2]\frac{\Delta\sigma_H - \Delta\sigma_h}{2\mu(1+\nu)}. \qquad (31)$$

This results in one of the two equations relating $A_1$ and $A_2$ $$A_1 - A_2 = 2\mu(1+\nu)\left[\frac{\Delta C_{55} - \Delta C_{44}}{\Delta\sigma_H - \Delta\sigma_h} - 1\right]. \qquad (32)$$

Different $A_1$ and $A_2$ values can be obtained for different $\Delta\theta_H/\Delta\theta_V$ as follows $$\Delta C_{55}^{\theta=0}(r/a=6) - \Delta C_{55}^{\theta=0}(r/a=2) = \qquad (33)$$
$$(\mu + A_1)[S_H^{\theta=0}(r/a=6) - S_H^{\theta=0}(r/a=2)] +$$
$$(-\mu(1+2\nu) + A_2)[S_h^{\theta=0}(r/a=6) - S_h^{\theta=0}(r/a=2)] +$$
$$(\mu + A_1)[S_v^{\theta=0}(r/a=6) - S_v^{\theta=0}(r/a=2)]$$

$$\frac{\Delta C_{55}^{\theta=0}(r/a=6) - \Delta C_{55}^{\theta=0}(r/a=2)}{\Delta\sigma_v} = \qquad (34)$$
$$(\mu + A_1)\left[\xi_1^{HH}\frac{\sigma_H}{\sigma_V} + \xi_2^{HH}\frac{\sigma_h}{\sigma_V} + \xi_3^{HH}\frac{P_W}{\sigma_V}\right] +$$
$$(-\mu(1+2\nu) + A_2)\left[\xi_1^{hh}\frac{\sigma_h}{\sigma_V} + \xi_2^{hh}\frac{\sigma_h}{\sigma_V} + \xi_3^{hh}\frac{P_W}{\sigma_V}\right] +$$
$$(\mu + A_1)\left[\xi_1^{vv}\frac{\sigma_h}{\sigma_V} + \xi_2^{vv}\frac{\sigma_h}{\sigma_V}\right]$$

where $$\xi_1^{HH} = -\frac{177}{2592} + \frac{17}{32}, \qquad (35)$$
$$\xi_2^{HH} = \frac{105}{2592} - \frac{9}{32},$$
$$\xi_3^{HH} = -\frac{1}{36} + \frac{1}{4},$$
$$\xi_1^{hh} = \frac{39}{2592} - \frac{1}{32},$$
$$\xi_2^{hh} = \frac{39}{2592} - \frac{7}{32},$$
$$\xi_3^{hh} = \frac{1}{36} - \frac{1}{4},$$
$$\xi_1^{vv} = -\frac{2}{36} + \frac{1}{2},$$
$$\xi_2^{vv} = \frac{2}{36} - \frac{1}{2}.$$

Equation (34) can be rewritten in a compact form shown below $$\frac{X_c}{\Delta\sigma_v} = (\mu + A_1)(S_1 + S_3) + (-\mu(1+2\nu) + A_2)S_2, \qquad (36)$$
where $$X_c = \Delta C_{55}^{\theta=0}(r/a=6) - \Delta C_{55}^{\theta=0}(r/a=2) \qquad (37)$$
$$S_1 = \left[\xi_1^{HH}\frac{\sigma_H}{\sigma_V} + \xi_2^{HH}\frac{\sigma_h}{\sigma_V} + \xi_3^{HH}\frac{P_W}{\sigma_V}\right]$$
$$S_2 = \left[\xi_1^{hh}\frac{\sigma_h}{\sigma_V} + \xi_2^{hh}\frac{\sigma_h}{\sigma_V} + \xi_3^{hh}\frac{P_W}{\sigma_V}\right]$$
$$S_3 = \left[\xi_1^{vv}\frac{\sigma_h}{\sigma_V} + \xi_2^{vv}\frac{\sigma_h}{\sigma_V}\right]$$

Similarly, $$\Delta C_{44}^{\theta=90}(r/a=6) - \Delta C_{55}^{\theta=0}(r/a=2) = \quad (38)$$
$$(\mu + A_1)[S_h^{\theta=90}(r/a=6) - S_H^{\theta=0}(r/a=2)] +$$
$$(-\mu(1+2\nu) + A_2)[S_H^{\theta=90}(r/a=6) - S_h^{\theta=0}(r/a=2)] +$$
$$(\mu + A_1)[S_\nu^{\theta=90}(r/a=6) - S_\nu^{\theta=0}(r/a=2)]$$

$$\frac{\Delta C_{44}^{\theta=90}(r/a=6) - \Delta C_{55}^{\theta=0}(r/a=2)}{\Delta \sigma_V} = \quad (39)$$
$$(\mu + A_1)\left[\psi_1^{hH}\frac{\sigma_H}{\sigma_V} + \psi_2^{hH}\frac{\sigma_h}{\sigma_V} + \psi_3^{hH}\frac{P_W}{\sigma_V}\right] +$$
$$(-\mu(1+2\nu) + A_2)\left[\psi_1^{Hh}\frac{\sigma_H}{\sigma_V} + \psi_2^{Hh}\frac{\sigma_h}{\sigma_V} + \psi_3^{Hh}\frac{P_W}{\sigma_V}\right] +$$
$$(\mu + A_1)\left[\psi_1^{\nu\nu}\frac{\sigma_H}{\sigma_V} + \psi_2^{\nu\nu}\frac{\sigma_h}{\sigma_V}\right]$$

where $$\psi_1^{hH} = \frac{105}{2592} - \frac{9}{32}, \quad (40)$$
$$\psi_2^{hH} = -\frac{177}{2592} + \frac{17}{32},$$
$$\psi_3^{hH} = -\frac{1}{36} + \frac{1}{4},$$
$$\psi_1^{Hh} = \frac{39}{2592} - \frac{1}{32},$$
$$\psi_2^{Hh} = \frac{33}{2592} - \frac{7}{32},$$
$$\psi_3^{Hh} = \frac{1}{36} - \frac{1}{4},$$
$$\psi_1^{\nu\nu} = \frac{2}{36} + \frac{1}{2},$$
$$\psi_2^{\nu\nu} = \frac{2}{-36} - \frac{1}{2}.$$

Equation (39) can be rewritten in a compact form as follows:

$$\frac{Y_c}{\Delta \sigma_v} = (\mu + A_1)(S_4 + S_6) + (-\mu(1+2\nu) + A_2)s_5, \quad (41)$$

where $$Y_c = \Delta C_{44}^{\theta=90}(r/a=6) - \Delta C_{55}^{\theta=0}(r/a=2), \quad (42)$$
$$S_4 = \left[\psi_1^{hH}\frac{\sigma_H}{\sigma_V} + \psi_2^{hH}\frac{\sigma_h}{\sigma_V} + \psi_3^{hH}\frac{P_W}{\sigma_V}\right],$$
$$S_5 = \left[\psi_1^{Hh}\frac{\sigma_H}{\sigma_V} + \psi_2^{Hh}\frac{\sigma_h}{\sigma_V} + \psi_3^{Hh}\frac{P_W}{\sigma_V}\right],$$
$$S_6 = \left[\psi_1^{\nu\nu}\frac{\sigma_H}{\sigma_V} + \psi_2^{\nu\nu}\frac{\sigma_h}{\sigma_V}\right]$$

Solving $$\frac{X_c}{\Delta \sigma_v} = (\mu + A_1)(S_1 + S_3) + (-\mu(1+2\nu) + A_2)S_2, \quad (43)$$

$$\frac{Y_c}{\Delta \sigma_v} = (\mu + A_1)(S_4 + S_6) + (-\mu(1+2\nu) + A_2)S_5, \quad (44)$$

for $A_1$ and $A_2$, yields $$A_1 = \frac{S_2 G_2 - S_5 G_1}{S_2(S_4 + S_6) - S_5(S_1 + S_3)}, \quad (45)$$

$$A_2 = \frac{(S_4 + S_6)G_1 - (S_1 + S_3)G_2}{S_2(S_4 + S_6) - S_5(S_1 + S_3)}, \quad (46)$$

where $$G_1 = \frac{X_c}{\Delta \sigma_V} + [-\mu(S_1 + S_3) + \mu(1 + 2\nu)S_2], \quad (47)$$

$$G_2 = \frac{Y_c}{\Delta \sigma_V} + [-\mu(S_4 + S_6) + \mu(1 + 2\nu)S_5]. \quad (48)$$

SHmax, Shmin, and an acoustoelastic coefficient Ae are calculated in step (414). The acoustoelastic parameter Ae is calculated as a function the stress ratio $\sigma_H/\sigma_V$ using equation (28). $\sigma_h/\sigma_V$ is calculated in terms of $\sigma_H/\sigma_V$ using equation (30). True Ae is calculated in terms of $C_{55}$, $C_{44}$, $\sigma_H$, and $\sigma_h$ using equation (18). A1 and A2 are calculated from equations (45) and (46). Ae is again calculated from equation (27). The error $\epsilon = abs\,[(Ae-True\,Ae)/True\,Ae]$ is minimized as a function of $\sigma_H/\sigma_V$. An estimated value of $\sigma_H/\sigma_V$ is obtained when the error $\epsilon$ is minimum. $\sigma_h/\sigma_V$ can then be calculated using equation (30). Pore pressure is then added to the estimated effective stresses to obtain absolute magnitude of formation stress magnitudes at the selected depth interval.

Figure 8:
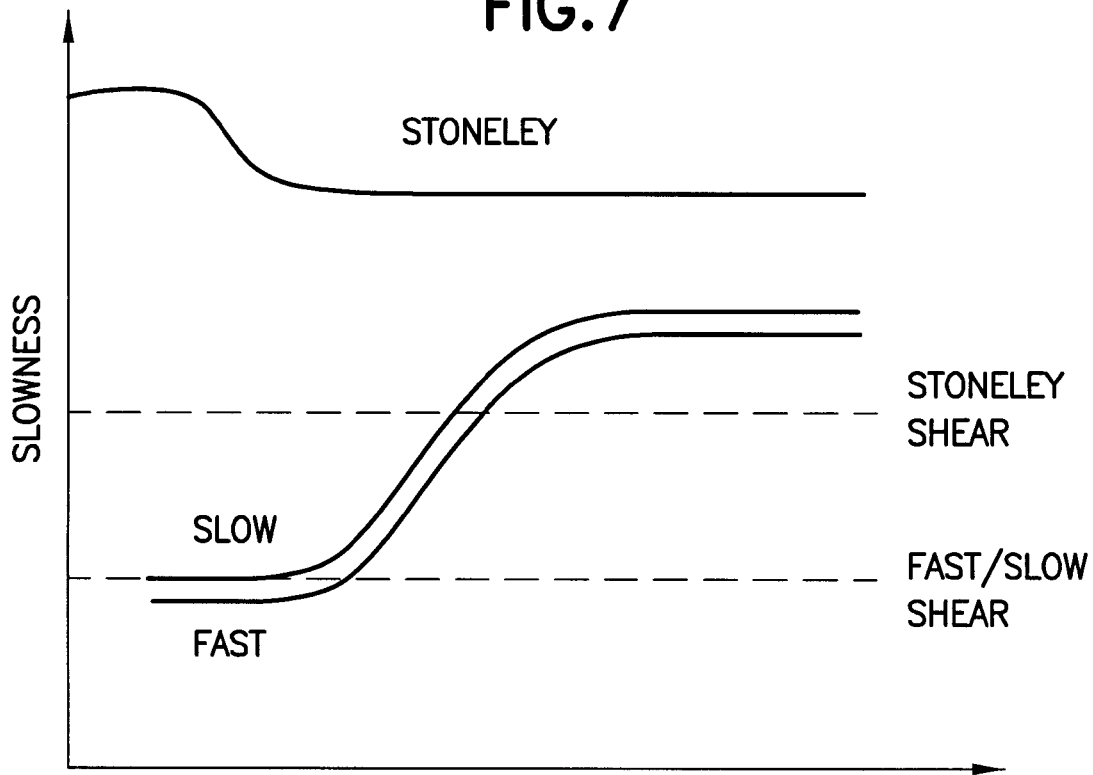
FIG. 8 illustrates fast and slow shear dispersion curves which do not exhibit a crossing signature, and the fast and slow dipole dispersions essentially overlay implying that SHmax=Shmin.

Referring back to step (406) and to FIGS. 4 and 8, in the case where the fast and slow shear dispersion curves do not exhibit a crossing signature, and the fast and slow dipole dispersions essentially overlay, step (416) is used. When the fast and slow dipole dispersions overlay, implying that there is no shear wave splitting for propagation along the borehole axis, it suggests that the maximum and minimum horizontal stresses (SHmax=Shmin) are nearly the same. Under these circumstances it is possible to estimate the ratio of the overburden stress Sv and the horizontal stress SH (SH=SHmax=Shmin) in a chosen depth interval with reasonably uniform lithology using the far-field sonic velocity (or slowness) gradients. Step (416) includes two component calculations for this particular case: Forming a difference equation using the far-field shear moduli C44(=C55), and C66; and forming another difference equation using [C55(r/a=6)−C55(r/a=2)]. An algorithm is then used to solve for the unknowns Ae and the effective stress ratio $\sigma_H/\sigma_V$, as indicated by step (418), which enables determination of the horizontal stress magnitude SH, and an acoustoelastic coefficient Ae, as indicated by step (420).

Figure 9:
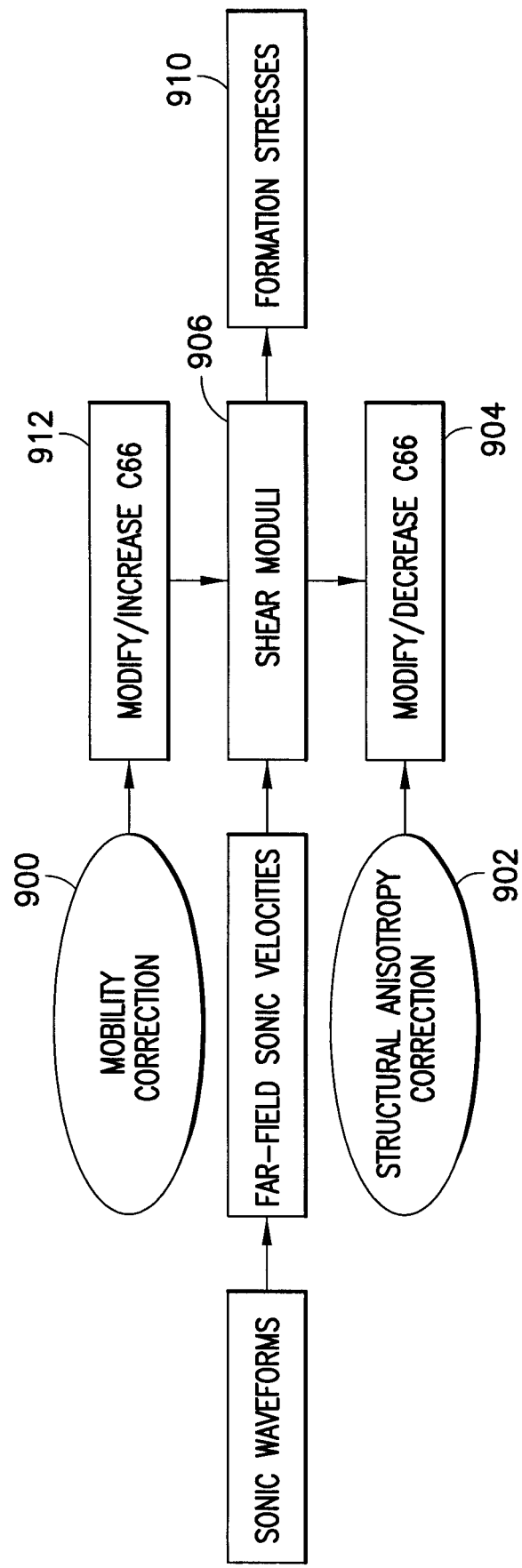
FIG. 9 illustrates an algorithm for solving for the unknowns Ae and $\sigma H/\sigma V$, which enables determination of SH, and an acoustoelastic coefficient Ae.

FIG. 9 shows a workflow for implementing necessary corrections in the shear modulus $C_{66}$ in the presence of either fluid mobility in a reservoir or structural anisotropy in shales. Estimation of formation stress magnitudes (910) using the three shear moduli requires compensation (912) for fluid mobility effects in a reservoir and structural anisotropy effects in overburden or underburden shales as calculated in step (900).

When fluid mobility estimates are known from any of the techniques known in the art, such as measurements on a core sample, pressure transient analysis, or nuclear magnetic resonance data, it is possible to calculate mobility-induced decrease in the Stoneley shear modulus $C_{66}$ using a standard Biot model. Under this situation, the workflow increases the measured $C_{66}$ by the same amount before inverting the three shear moduli for formation stresses.

In contrast, structural anisotropy effects in shales cause the Stoneley shear modulus $C_{66}$ to be larger than the dipole shear moduli $C_{44}$ or $C_{55}$. One way to compensate for the structural or intrinsic anisotropy effects, as indicated in step (902), is to measure shear velocities propagating parallel and perpendicular to the layer in a core sample subjected to a confining pressure and estimate the Thomsen anisotropy parameter γ. Insofar as the shale anisotropy increases the magnitude of $C_{66}$, we must decrease the measured $C_{66}$ by the same amount in step (904) before inverting the three shear moduli in step (906) for formation stress magnitudes.

One option ("Algorithm I"), is to estimate the horizontal to overburden stress ratio in a reasonably uniform depth interval using differences in the compressional and shear slownesses at two depths within the chosen interval. Another option ("Algorithm II") is to estimate the horizontal to overburden stress ratio using the two far-field shear moduli ($C_{44}$ and $C_{66}$), and radial profile of the dipole shear modulus ($C_{44}$). This algorithm can be applied in depth intervals that are axially heterogeneous insofar as the difference equations use shear moduli at the same chosen depth.

Algorithm I will now be described. There are two sets of quantities that need to be estimated from the inversion of changes in sonic velocities caused primarily by formation stress changes. The first set involves determination of the three nonlinear constants, and the second set comprises the estimation of stress magnitudes. The acoustoelastic equations relating changes in the sonic velocities caused by changes in stresses in the propagating medium contain product of unknown quantities. When the horizontal stresses SHmax and Shmin are nearly the same, and they can be approximately obtained from the Poisson's ratio in the vertical $X_2$-$X_3$ plane in terms of changes in the vertical effective stress $\Delta\sigma_V$ or $\Delta\sigma_{33}$. The steps described below can be utilized.

Given $$\Delta\sigma_{11} = \Delta\sigma_{22} = \left(\frac{v}{1-v}\right)\Delta\sigma_{33}, \qquad (49)$$

where $\Delta\sigma_{11}$ and $\Delta\sigma_{22}$ denote the maximum and minimum horizontal stresses, an incremental change in the effective stiffness $\Delta C_{55}$ can be expressed in terms of changes in the effective vertical stress between two depths in a reasonably uniform lithology interval $$\Delta C_{55} = \left[1 + \frac{(1-v-2v^2)}{2(1-v^2)}\right]\left(1 + \frac{C_{155}}{\mu}\right)\Delta\sigma_{33}. \qquad (50)$$

where $C_{155}$ is one of the three nonlinear constants referred to the chosen depth interval. An incremental change in the effective stiffness $\Delta C_{66}$ can be expressed in terms of changes in the effective vertical stress between two depths in a reasonably uniform lithology interval $$\Delta C_{66} = \left[\frac{v}{1-v} + \frac{(1-v-2v^2)}{2(1-v^2)}\left(\frac{C_{144}}{\mu} - 1\right)\right]\Delta\sigma_{33}, \qquad (51)$$

where $C_{144}$ is another nonlinear constants referred to the chosen depth interval. An incremental change in the effective stiffness $\Delta C_{33}$ can be expressed in terms of changes in the effective vertical stress between two depths in a reasonably uniform lithology interval $$\Delta C_{33} = \left[1 + \frac{(1-v-2v^2)}{2(1-v^2)}\left(\frac{C_{111}}{\mu} - \frac{3C_{33}}{\mu}\right)\right]\Delta\sigma_{33}, \qquad (52)$$

where $C_{111}$ is the third nonlinear constant referred to the chosen depth interval. Equations (50), (51), and (52) are used to calculate the three nonlinear constants ($C_{111}$, $C_{144}$, $C_{155}$) in the chosen depth interval. These nonlinear constants together with linear constants enable determination of the stress coefficients of velocities in the chosen depth interval.

A second step is to use general 3D-equations relating changes in the effective stresses to corresponding changes in the effective elastic moduli and estimate the unknown stress magnitudes SHmax and Shmin in the chosen depth interval where the three nonlinear constants have been estimated. These equations are as shown below:

$$\Delta C_{55} = [C_{55} - vC_{144} + (1-v)C_{155}]\frac{\Delta\sigma_{11}}{2\mu(1+v)} + \qquad (53)$$
$$[C_{144} - (1+2v)C_{55} - 2vC_{155}]\frac{\Delta\sigma_{22}}{2\mu(1+v)} +$$
$$[2\mu(1+v) + C_{55} - vC_{144} + (1-v)C_{155}]\frac{\Delta\sigma_{33}}{2\mu(1+v)},$$

where $\Delta C_{55}$ is obtained from the fast-dipole shear slowness and formation bulk density at the top and bottom of the interval.

$$\Delta C_{44} = [-(1+2v)C_{44} + C_{144} - 2vC_{155}]\frac{\Delta\sigma_{11}}{2\mu(1+v)} + \qquad (54)$$
$$[-vC_{144} + C_{44} + (1-v)C_{155}]\frac{\Delta\sigma_{22}}{2\mu(1+v)} + [2\mu(1+v) +$$
$$C_{44} - vC_{144} + (1-v)C_{155}]\frac{\Delta\sigma_{33}}{2\mu(1+v)},$$

where $\Delta C_{44}$ is obtained from the slow-dipole shear slowness and formation bulk density at the top and bottom of the interval.

$$\Delta C_{66} = [\mu(1+v) + C_{66} - vC_{144} + (1-v)C_{155}]\frac{(\Delta\sigma_{11} + \Delta\sigma_{22})}{2\mu(1+v)} + \qquad (55)$$
$$[-(1+2v)C_{66} + C_{144} - 2vC_{155}]\frac{\Delta\sigma_{33}}{2\mu(1+v)},$$

where $\Delta C_{66}$ is obtained from the Stoneley shear slowness dispersion and formation bulk density at the top and bottom of the interval.

$$\Delta C_{33} = [(1-2v)C_{111}]\frac{(\Delta\sigma_{11} + \Delta\sigma_{22} + \Delta\sigma_{33})}{2\mu(1+v)} + \qquad (56)$$
$$[-(1+2v)C_{33} - 4(1-v)C_{155}]\frac{(\Delta\sigma_{11} + \Delta\sigma_{22})}{2\mu(1+v)} +$$
$$[2\mu(1+v)(3+2v)C_{33} + 8vC_{155}]\frac{\Delta\sigma_{33}}{2\mu(1+v)},$$

where $\Delta C_{33}$ is obtained from the compressional slowness and formation bulk density at the top and bottom of the interval. Note that the Young's modulus $Y=2\mu(1+v);$ and $$\Delta C_{33} = \rho_B V_{C,B}^2 - \rho_A V_{C,A}^2, \qquad (57)$$

$$\Delta C_{44} = \rho_B V_{SS,B}^2 - \rho_A V_{SS,A}^2, \qquad (58)$$

$$\Delta C_{55} = \rho_B V_{FS,B}^2 - \rho_A V_{FS,A}^2, \quad (59)$$

$$\Delta C_{66} = \rho_B V_{HS,B}^2 - \rho_A V_{HS,A}^2, \quad (60)$$

where the index A and B denote the top and bottom of the chosen depth interval.

Estimation of $C_{144}$ and $C_{155}$ in a uniform lithology interval will now be described. Assuming cross-dipole dispersions overlay implying that there is no shear wave splitting, then SHmax ($\sigma_{11}$)=Shmin ($\sigma_{22}$), and in equations (52) and (53), $\sigma_{11} = \sigma_{22}$. The objective is to invert the borehole Stoneley and dipole slowness data to estimate the ratio of $\Delta\theta_V/\Delta\theta_h$ in a given depth interval with a reasonably uniform lithology. Over a given depth interval, $$\Delta C_{44} = \Delta \sigma_{33} + \left[ -\frac{(1+2v)}{2(1+v)} \Delta \sigma_{11} + \frac{(\Delta \sigma_{22} + \Delta \sigma_{33})}{2(1+v)} \right] \frac{C_{44}}{\mu} + \left[ \frac{\Delta \sigma_{11}}{2(1+v)} - \frac{v}{2(1+v)} (\Delta \sigma_{22} + \Delta \sigma_{33}) \right] \frac{C_{144}}{\mu} + \left[ -\frac{v}{(1+v)} \Delta \sigma_{11} + \frac{(1-v)}{2(1+v)} (\Delta \sigma_{22} + \Delta \sigma_{33}) \right] \frac{C_{155}}{\mu}, \quad (61)$$

$$\Delta C_{66} = \frac{1}{2} (\Delta \sigma_{11} + \Delta \sigma_{22}) + \left[ \frac{(\Delta \sigma_{11} + \Delta \sigma_{22})}{2(1+v)} - \frac{(1+2v)}{2(1+v)} \Delta \sigma_{33} \right] \frac{C_{66}}{\mu} + \left[ \frac{\Delta \sigma_{33}}{2(1+v)} - \frac{v}{2(1+v)} (\Delta \sigma_{11} + \Delta \sigma_{22}) \right] \frac{C_{144}}{\mu} + \left[ -\frac{v}{(1+v)} \Delta \sigma_{33} + \frac{(1-v)}{2(1+v)} (\Delta \sigma_{11} + \Delta \sigma_{22}) \right] \frac{C_{155}}{\mu}, \quad (62)$$

It is now possible to solve for the nonlinear parameters $C_{144}$ and $C_{155}$ from the following matrix equation:

$$\begin{bmatrix} A_{11} & A_{12} \\ A_{21} & A_{22} \end{bmatrix} \begin{Bmatrix} \frac{C_{144}}{\mu} \\ \frac{C_{155}}{\mu} \end{Bmatrix} = \begin{Bmatrix} B_1 \\ B_2 \end{Bmatrix}, \quad (63)$$

where $$A_{11} = \frac{\Delta \sigma_{11}}{2(1+v)} - \frac{v}{2(1+v)} (\Delta \sigma_{22} + \Delta \sigma_{33}), \quad (64)$$

$$A_{12} = -\frac{v}{(1+v)} \Delta \sigma_{11} + \frac{(1-v)}{2(1+v)} (\Delta \sigma_{22} + \Delta \sigma_{33}), \quad (65)$$

$$B_1 = \Delta C_{44} - \Delta \sigma_{33} + \left[ \frac{(1+2v)}{2(1+v)} \Delta \sigma_{11} - \frac{(\Delta \sigma_{22} + \Delta \sigma_{33})}{2(1+v)} \right] \frac{C_{44}}{\mu}, \quad (66)$$

$$A_{21} = \frac{\Delta \sigma_{33}}{2(1+v)} - \frac{v}{2(1+v)} (\Delta \sigma_{11} + \Delta \sigma_{22}), \quad (67)$$

$$A_{22} = -\frac{v}{(1+v)} \Delta \sigma_{33} + \frac{(1-v)}{2(1+v)} (\Delta \sigma_{11} + \Delta \sigma_{22}), \quad (68)$$

$$B_2 = \Delta C_{66} - \frac{1}{2} (\Delta \sigma_{11} + \Delta \sigma_{22}) - \left[ \frac{(\Delta \sigma_{11} + \Delta \sigma_{22})}{2(1+v)} - \frac{(1+2v)}{2(1+v)} \Delta \sigma_{33} \right] \frac{C_{66}}{\mu}, \quad (69)$$

Having estimated the acoustoelastic coefficient $A_E$ in terms of $C_{144}$ and $C_{155}$ as described by equation (68), $$A_E = 2 + \frac{C_{155} - C_{144}}{2\mu}, \quad (68)$$

t is possible to estimate the ratio of the vertical to horizontal effective stresses from the equation given below:

$$A_E = \frac{\Delta C_{55} - \Delta C_{66}}{\Delta \sigma_V - \Delta \sigma_h}, \quad (69)$$

where all quantities on the RHS are estimated at a given depth. Therefore, the ratio of the vertical to horizontal effective stresses can now be calculated from the equation given below:

$$\frac{\Delta \sigma_V}{\Delta \sigma_h} = 1 + \frac{\Delta C_{55} - \Delta C_{66}}{\Delta \sigma_h A_E}, \quad (70)$$

or equivalently, $$\frac{\Delta \sigma_h}{\Delta \sigma_V} = 1 - \frac{\Delta C_{55} - \Delta C_{66}}{\Delta \sigma_V A_E}, \quad (71)$$

Algorithm II is a preferred technique in environments where the formation exhibits azimuthal isotropy in cross-dipole dispersions implying that horizontal stresses are nearly the same at all azimuths. Further, this technique is more suitable for formations where lithology is rapidly changing with depth than Algorithm I. The presence of a borehole causes near-wellbore stress distributions that can be described by equations (1) through (4).

In the absence of a borehole, the far-field stresses are given by equations (5) through (8).

Subtracting the far-field stresses from the near-wellbore stresses yields incremental stresses as we approach the borehole surface and are given by equations (9) through (12).

When the formation lithology is rapidly changing with depth, a more suitable way to invert borehole sonic data for the horizontal to overburden stress ratio may be to use radial profiles of the three shear moduli together with near-wellbore stress distributions in terms of the far-field stresses as described by Kirsch's equations (Jaeger and Cook, 1969). This procedure includes the steps described below. The effective radial and hoop stresses as a function of radial position in polar coordinates can be expressed in terms of the far-field horizontal stress and over- or under-pressure $\Delta P_W = (P_w - P_P)$, in the wellbore fluid using:

$$\sigma_{rr}(r = 2a, \theta = 0^\circ) = -\frac{1}{4}(\sigma_H + \Delta P_W), \quad (72)$$

$$\sigma_{\theta\theta}(r = 2a, \theta = 0^\circ) = \frac{1}{4}(\sigma_H + \Delta P_W), \quad (73)$$

where $\theta = 0^\circ$, corresponds to the azimuth parallel to the maximum horizontal stress direction. Similarly, the radial and hoop stresses at r=5a, can be obtained from equations (9) through (12) and they take the form $$\sigma_{rr}(r=5a,\theta=0^0)=-\frac{1}{25}(\sigma_H+\Delta P_W), \quad (74)$$

$$\sigma_{\theta\theta}(r=5a,\theta=0^0)=\frac{1}{25}(\sigma_h+\Delta P_W), \quad (75)$$

Changes in the fast dipole shear modulus C55 at radial positions r=2a and r=5a, caused by the presence of local stresses can be expressed as $$\Delta C_{55}(r=2a)=\frac{1}{4}(2C_{55}+C_{155}-C_{144})(1+\upsilon)(\sigma_H+\Delta P_W), \quad (76)$$

$$\Delta C_{55}(r=5a)=\frac{1}{25}(2C_{55}+C_{155}-C_{144})(1+\upsilon)(\sigma_H+\Delta P_W). \quad (77)$$

Form a difference equation $$\Delta C_{55}(r=2a)-\Delta C_{55}(r=5a)=\zeta(2C_{55}+C_{155}-C_{144})(1+\upsilon)(\sigma_H+\Delta P_W), \quad (78)$$

where $\zeta=1/4-1/25=0.21$.

Use the following equation to calculate the left-hand-side of equation (78)

$$\Delta C_{55}(r=2a)-\Delta C_{55}(r=5a)=\rho[V_S^2(r=2a)-V_S^2(r=5a)], \quad (79)$$

where $V_S$ denotes the shear velocity at different radial positions obtained from the Dipole Radial Profiling (DRP) of shear velocity. The acoustoelastic coefficient $A_E$ can be written as $$A_E=\frac{C_{55}-C_{66}}{\sigma_V(1-x)}=2+\frac{C_{155}-C_{144}}{2\mu}, \quad (80)$$

where $\mu$ is the far-field shear modulus in the assumed reference state. Replacing $(C_{155}-C_{144})$ in terms of the far-field shear modulus $C_{55}$ and $C_{66}$ from equation (80) yields, from equation (78), $$\rho[V_S^2(r=2a)-V_S^2(r=5a)]= \quad (81)$$
$$\left[2C_{55}-2\mu\left(\frac{C_{55}-C_{66}}{\sigma_V-\sigma_H}-2\right)\right](1+\upsilon)(\sigma_H+\Delta P_W)\zeta,$$

Since the effective overburden stress is generally known, it is possible solve for the horizontal to overburden stress ratio from the following equation $$[V_S^2(r=2a)-V_S^2(r=5a)]= \quad (82)$$
$$\left[2C_{55}-2\mu\left(\frac{C_{55}-C_{66}}{\sigma_V(1-x)}-2\right)\right](1+\upsilon)(x\sigma_V+\Delta P_W)\zeta,$$

where $\sigma_H=x\sigma_V$, and it is possible to solve for this unknown from equation (82), which is a quadratic equation in "x". Alternatively, it is possible to construct a cost function $\epsilon$ that needs to be minimized as a function of the unknown parameter "x". This cost function $\epsilon$ takes the form $$\epsilon=\frac{|\xi_1-\xi_2(x)|}{|\xi_1|}, \quad (83)$$

where $$\xi_1=\rho[V_S^2(r=2a)-V_S^2(r=5a)], \quad (84)$$

and $$\xi_2=\left[2C_{55}-2\mu\left(\frac{C_{55}-C_{66}}{\sigma_V(1-x)}-2\right)\right](1+\upsilon)(x\sigma_V+\Delta P_W)\zeta. \quad (85)$$

Since the shear modulus $C_{66}$ is also affected by reservoir fluid mobility and overburden shale anisotropy, there is a need to compensate for these effects on the estimation of stress magnitudes using sonic data. One approach is to estimate the horizontal to overburden stress ratio as a function of parameter $\gamma=C'_{66}/C_{66}$. If the fluid mobility causes a decrease in the measured $C_{66}$ by 10%, then the measured $C_{66}$ can be increased by 10% (referred to as the corrected $C'_{66}$). Hence, it is possible to estimate stress magnitudes uosing this algorithm for $\gamma=1.1$, and this estimate is effectively compensated for fluid mobility bias on measured $C_{66}$.

Similarly to the approach described above, in order to estimate stress magnitudes in the overburden shale that generally exhibits transversely-isotropic (TI) anisotropy, one approach is to determine the magnitude of TI-anisotropy in terms of the ratio of $C_{66}/C_{44}$ from core data. If this ratio is 1.3, then the measured $C_{66}$ is decreased by 30% in order to remove the structural anisotropy effects from the stress magnitude estimation algorithm. Consequently, the estimate of stress magnitudes in this shale interval corresponds to the values obtained for $\gamma=0.7$. Therefore, the parameter x is estimated for a range of $C'_{66}=\gamma C_{66}$. Finally, the ratio of the horizontal to overburden stress is given by:

$$S_H/S_V=(x\sigma_V+\alpha P_P)/(\sigma_V+\alpha P_P). \quad (86)$$

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method for estimating stress in a formation in which a borehole is present comprising:
   determining radial profiles of Stoneley slowness, fast dipole shear slowness, and slow dipole shear slowness;
   calculating dipole shear moduli C44 and C55 using the fast dipole shear slowness and the slow dipole shear slowness;
   calculating modulus C66 using the Stoneley slowness;
   estimating maximum and minimum horizontal stresses by inverting (i) difference equations obtained from far-field shear moduli C44, C55, and C66, (ii) difference equations obtained from radial profiles of dipole shear moduli C44 and C55 at two or more different radial positions, and (iii) a relationship between stresses within the formation proximate to the borehole and stresses in the far-field of the formation; and
   producing an indication of the maximum and minimum horizontal stresses in tangible form.

2. The method of claim 1 further comprising determining that fast and slow shear dispersion curves of the formation exhibit a crossing signature.

3. The method of claim 1 further comprising estimating a reduction in the Stoneley shear modulus (C66) caused by the fluid mobility in a reservoir and increasing the measured C66 by the same amount to obtain the maximum and minimum horizontal stress magnitudes that are compensated for fluid mobility effects.

4. Apparatus for estimating stress in a formation in which a borehole is present comprising:
 at least one acoustic sensor that provides radial profiles of Stoneley, fast dipole shear and slow dipole shear slownesses;
 processing circuitry that estimates maximum and minimum horizontal stresses by inverting (i) differences in far-field shear moduli C44, C55, and C66, (ii) difference equations obtained from radial profiles of dipole shear moduli C44 and C55 at two or more different radial positions, and (iii) a relationship between stresses within the formation proximate to the borehole and stresses in the far-field of the formation; and
 an output that produces an indication of the maximum and minimum horizontal stresses in tangible form.

5. The apparatus of claim 4 wherein the processing circuitry is operative to utilize the determining and estimating functions only when fast and slow shear dispersion curves of the formation exhibit a crossing signature.

6. The apparatus of claim 4 wherein the processing circuitry estimates a reduction in the Stoneley shear modulus (C66) caused by the fluid mobility in a reservoir and increases the measured C66 by the same amount to obtain the maximum and minimum horizontal stress magnitudes that are compensated for fluid mobility effects.

* * * * *